United States Patent [19]

Anatol

[11] 3,897,467

[45] July 29, 1975

[54] PROCESS FOR THE PREPARATION OF α-KETOCARBOXYLIC ACIDS

[75] Inventor: Jesus Anatol, Paris, France

[73] Assignee: Sucreries du Soissonnais et Compagnie Scuriere, Paris, France

[22] Filed: Mar. 2, 1972

[21] Appl. No.: 231,381

[30] Foreign Application Priority Data

Mar. 2, 1971 France ............................. 71.07097

[52] U.S. Cl. ......... 260/406; 260/515 R; 260/526 R; 260/558 R; 260/561 K; 260/562 K; 260/413
[51] Int. Cl.² C07D 59/33; C07D 59/34; C07D 65/20
[58] Field of Search ............ 260/515 R, 483, 526 R, 260/406

[56] References Cited
UNITED STATES PATENTS 2,446,849  8/1948  Price et al. ........................... 260/406

OTHER PUBLICATIONS

Zabicky, "The Chemistry of Amides" (1969) pp. 824–825.
Kuwata, J. Am. Chem. Soc. (1938) p. 559 (cited in disclosure).
House, "Modern Synthetic Reactions," (1972) page 257.
Giraud–Clenet et al., Comptes Rendus, 262 Ser. C, (1966), p. 224–227.
Sundaram et al., L. A., Vol. 62, p. 8967a.
Otsuka et al., L. A., Vol. 71, 90864c.

*Primary Examiner*—Anton H. Sutto
*Assistant Examiner*—Michael Shippen

[57] ABSTRACT

A process for the preparation of α-keto-carboxylic acids for the formula: R-CO-COOH in which R represents an aliphatic, aromatic, aralkyl, alicyclic or heterocyclic radical which may or may not be substituted which comprises treating a α-hydroxy carboxamide of the formula:

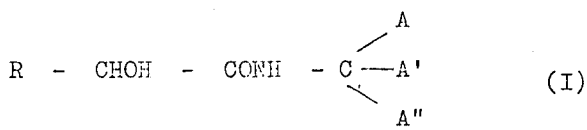

wherein A represents a hydrogen atom or an aliphatic or aralkyl radical, A' and A" each represent an aliphatic or aralkyl radical or form, together with the carbon atom to which they are bonded, a cycloalkane residue and R represents an aliphatic, aromatic, aralkylic, alicyclic or heterocyclic radical which may or may not be substituted with an oxidizing agent, and hydrolysing in acid medium the α-ketocarboxamide so obtained of the formula:

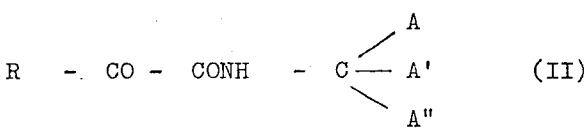

wherein A, A', A" and R have the same meaning as above; α-ketocarboxamides of the formula:

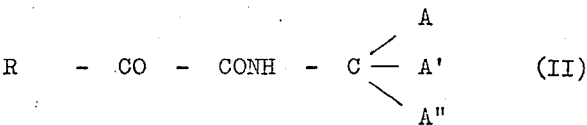

wherein R, A, A' and A" have the meanings given above and 3,3-dibenzylpyruvic acid.

13 Claims, No Drawings

PROCESS FOR THE PREPARATION OF α-KETOCARBOXYLIC ACIDS

The invention relates to a new general process for the preparation of α-ketocarboxylic acids of general formula: R—CO—COOH.

Among these acids a good many are essential intermediates of metabolism either as precursors of α-amino acids or intervening in the processes of transmamination or taking part in glucidic metabolism.

These acids may also be used as intermediate products in the manufacture of dyestuffs.

Their synthesis has formed the subject of a number of important works which can be summarised as follows:

1. Action of an acid halide upon a metal cyanide (copper or silver) followed by hydrolysis:

R—CO — Hal + Met.CN → R-CO-CN → R—CO—COOH

This method fails to give appreciable results when R in an aliphatic series contains more than 3 carbon atoms (L. GLAISEN and F. MORITZ Ber. 13-1880 p. 2121; W. TSCHELINZEFF and W. SCHMIDT Ber. 62-1929 p. 2210).

2. Hydrolysis of the esters of 2-hydroxyimino carboxylic acids according to the method of R. BOUVEAULT and L. LOCQUIN (C. R. Acad. Sci. 135, 1902 p. 179).

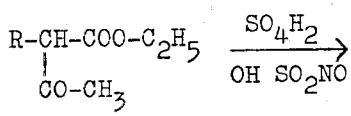

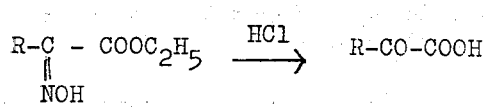

F. ADICKES and G. ANDRESSEN Ann. 555, 1944/41 observe that the yields are low and adopt the following process 3.

3. Condensation of esters of aliphatic carboxylic acids with ethyl oxalate in the presence of sodium ethoxide.
   (W. WISLICENUS, Ber. 20, 1887 p. 589 p. 3392 and p. 3394):

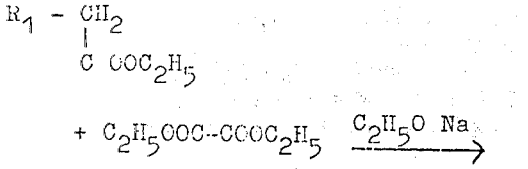

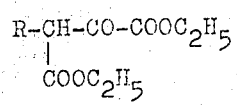

followed by hydrolysis of the diester of 3-alkyl-2-oxobutane-1,4-dicarboxylic acid and decarboxylation to the α-keto acid R—CH$_2$—CO—COOH.

4. Action of organo-magnesium compounds upon ethyl N-diethyloxamate (R. BARRE, Ann. de Chim. (10) - 9 - 1928 p. 204)

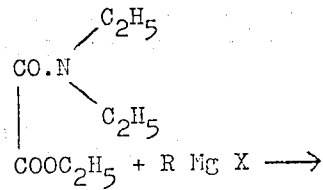

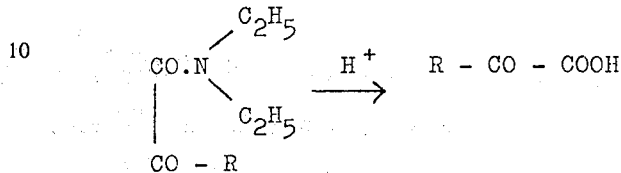

5. Action of an excess of piperidine upon the esters of aliphatic α,β-dibrominated carboxylic acids and acid hydrolysis of the esters of the α,β-dipiperidino-carboxylic acid so obtained. (H. MOUREAUX and others Bul. Soc. Chim. 1952 p. 296 and 442).

However, the authors mention that their process is of limited applicability; thus for example dimethyl acrylic acid does not lead to 2-oxo-isovaleric acid.

6. Hydrogenation by potassium hydroboride of 4-phenyl-2-oxo-3-butene carboxylic acids and treatment with sodium hydroxide at elevated temperature of the 4-phenyl-2-hydroxy-3-butene carboxylic acids, by which treatment the corresponding saturated α-keto acids are obtained. (P. CORDIER Bul. soc. chim. 1956 p. 564).

7. Conversion of the 2-trifluoroacetylamino carboxylic acids to 2-trifluoromethyl-5-oxazolones followed by isomerisation and by hydrolysis to α-keto acids (F. WEYGAND et al. Ann. 658, 1962 p. 128).

8. Synthesis of α-ketocarboxylic acids starting from esters of alkylidenecyano acetic acids (M.I. GARASHI and H. MIDORIKAWA (J. Orgn. Chem. 28, 1963 p. 3088 and 32, 1967 p. 3399).

9. Action of organo-lithium derivatives upon isonitriles followed by carbonation of the aldimine lithium so obtained and hydrolysis (H. M. WALBORSKY and G. E. NIZNIK J. Am. Chem. Soc. 91 1969 p. 7778).

10. Oxidation of α-hydroxy acids (G. V. BAKORE J. Chem. Soc. 1963 p. 3419) or their esters (T. KUWATA J. Am. Chem. Soc. 1938 p. 559). The tests carried out in this direction were not conclusive.

It has now been found that it is possible to obtain α-ketocarboxylic acids, in general in very good yields, by a process which comprises treating a α-hydroxy carboxamide of the general formula:

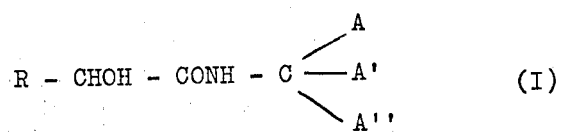

wherein A represents a hydrogen atom or an aliphatic or aralkyl radical, A' and A'' each represent an aliphatic or aralkyl radical or form, together with the carbon atom to which they are linked, a cycloalkane residue, and R represents an aliphatic, aromatic, aralkyl, alicyclic or heterocyclic residue which may or may not be substituted with an oxidizing agent and in hydrolyzing in acid medium the α-ketocarboxamide so obtained of formula:

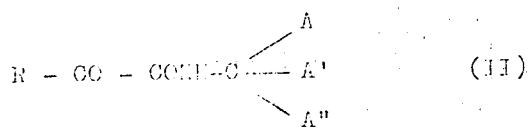

wherein A, A', A" and R have the meanings given above.

The ketocarboxamides of formula II are new products;
they form as such part of the invention. Among them may be mentioned in particular the N-tert.butyl α-ketocarboxamides, the hydrocarbon radical R of which possesses 1 to 15 carbon atoms. These compounds of formula II are perfectly stable and lend themselves well to purification, either by distillation or by recrystallization from solvents.

The α-hydroxy carboxamides which may be used as starting materials for the carrying out of the process of the invention can be obtained for example according to known processes, by condensation in acid medium of secondary or tertiary alcohols of the general formula:

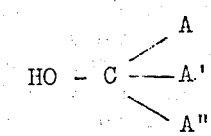

wherein A, A' and A" have the meanings given above with 2-hydroxy nitriles of formula R—CHOH—CN. The oxidizing treatment of the α-hydroxy carboxamides of formula I can be effected for example with mineral oxidants such as: permanganates, manganese dioxide or chromium trioxide. The latter is particularly advantageous, since the salts resulting from its reduction do not give rise to precipitates.

The hydrolysis of the α-ketocarboxamides by acids may be effected for example either in aqueous medium, or in a solvent, at a temperature up to boiling point. The medium may advantageously consist of acetic acid.

The α-ketocarboxylic acids can be separated simply for example by dilution of the reaction medium from which they crystallize or by extraction with organic solvents, if their solubility in water is appreciable. They can be purified for example by distillation or by recrystallization. Some of them, moreover, are new products.

The invention is illustrated by the following Examples in which the parts specified are parts by weight unless otherwise stated.

EXAMPLE 1

Preparation of 2-oxo-isovaleric acid

A. 49.5 parts of 3,3-dimethyl-2-hydroxy-propanenitrile prepared according to a classical method from isobutyraldehyde are dissolved in 75 parts by volume of tert-butyl alcohol. To this solution are added 75 parts by volume of 66°Be sulphuric acid with cooling so that the internal temperature should not exceed 50°C. The mixture is allowed to stand overnight, then the reaction mass is diluted with 400 parts of water and the suspension so obtained is neutralized by the addition of a concentrated solution of sodium hydroxide.

2-hydroxy-N-tert.butyl isovaleramide crystallizes. It is filtered, washed with water and dried. The weight obtained is nearly that indicated by theory. After recrystallization from 2 volumes of ethyl acetate, 71 parts of a recrystallized product M.p. 123°C. are obtained (yield 82%).

| Analysis for | $C_9H_{19}NO_2$ | M.W. = 173 | |
|---|---|---|---|
| Calculated: | C% 62.43 | H% 10.98 | N% 8.09 |
| Found: | 62.60 | 10.93 | 8.07 |

B. 43 parts of the 2-hydroxy isovaleramide obtained above are dissolved in 100 parts by volume of acetic acid. Furthermore, 21 parts of chromium trioxide ($CrO_3$) are dissolved in 20 parts of water with 180 parts by volume of acetic acid. The second solution is poured into the first; a moderate rise in temperature occurs. The mixture is allowed to stand overnight, then it is diluted with 300 parts of water and extracted with ether (3 times 100 parts by volume). The ether layer is washed with a 4 N sodium hydroxide solution and then with water. The ether is removed at reduced pressure and the residue is distilled (B.p. 81°C/10 mm).

34 parts of 2-oxo-N-tert.butyl isovaleramide are obtained, that is a yield of distilled product of 73%.

| Analysis for | $C_9H_{17}NO_2$ | M.W. = 171 | |
|---|---|---|---|
| Calculated: | C% 63.12 | H% 10.01 | N% 8.18 |
| Found: | 63.13 | 10.00 | 8.15 |

This compound gives as a characteristic derivative the 2',4'-dinitro-2-phenylhydrazono-N.tert-butyl isovaleramide. M.p. 151°C.

| Analysis for | $C_{15}H_{21}N_5O_5$ | M.W. = 351 | |
|---|---|---|---|
| Calculated: | C% 51.28 | H% 6.02 | N% 19.93 |
| Found: | 51.31 | 6.17 | 19.95 |

C. 43 parts of 2-oxo-N.tert-isovaleramide are suspended in 172 parts by volume of 5 N hydrochloric acid. The suspension is heated under reflux for nine hours. The homogeneous solution is extracted with ether (six times 100 parts); the ether is removed at reduced pressure and the 2-oxo isovaleric acid is distilled at reduced pressure.
B.p. = 70°C./12 mm. The product solidifies.
M.p. 31°C. in accordance with literature.
26 parts are obtained, that is a yield of 89%.

| Analysis for | $C_5H_8O_3$ | M.W. = 116 | |
|---|---|---|---|
| Calculated: | C% 51.72 | H% 6.94 | |
| Found: | 51.55 | 7.04 | |

Characteristic derivative: 2',4'-dinitro-2-phenylhydrazonoisovaleric acid.

| Analysis for | $C_{11}H_{12}N_4O_6$ | M.W. = 296 | |
|---|---|---|---|
| Calculated: | C% 44.60 | H% 4.08 | N% 18.91 |
| Found: | 44.59 | 4.04 | 18.88 |

EXAMPLE 2

Preparation of 3,3-dibenzyl pyruvic acid

This α-ketoacid has not been described in the literature.

A. Into a 3-necked flask fitted with a stirrer and a thermometer, are placed 92 parts of monopotassium phosphate, 200 parts of water and 150 parts of dibenzyl acetaldehyde.

The stirrer is started and 53 parts of commercial potassium cyanide dissolved in 200 parts of water are added all at once; the temperature rises to 41°–42°C. Stirring is continued for 2 to 3 hours.

The medium containing the 3,3-dibenzyl-2-hydroxypropanenitrile which is formed (J. ANATOL C. R. Acad. Sci. 235, 1952 p. 249) is taken up in ether (450 + 75 + 75). The ether solution is washed with 2 N sulphuric acid (2×25) then with water (2×25). It is dried over anhydrous sodium sulphate, filtered and the ether is removed at reduced pressure. The residue solidifies. Its weight is that indicated by theory. To recrystallize the product it is dissolved in 175 parts by volume of benzene at elevated temperature, 350 parts of petroleum ether are added, the product is filtered and dried. 153 parts of recrystallized product are obtained. M.p. = 97°C. Yield 91%.

| Analysis for | $C_{17}H_{17}NO$ | M.W. = 251.3 | |
|---|---|---|---|
| Calculated: | C% 81.24 | H% 6.82 | N% 5.57 |
| Found: | 81.20 | 6.94 | 5.64 |

75 parts of 3,3-dibenzyl-2-hydroxy-propanenitrile are dissolved in 300 parts by volume of trimethyl carbinol. To this solution, without exceeding 50°C. and with stirring, are added 35 parts by volume of 66°Be sulphuric acid. The mixture is allowed to stand for 48 hours, it is heated to 75°C. for one hour, 450 parts of cold water are added and the emulsion is neutralized in the presence of phenolphthalein with a solution of sodium hydroxide. An oil separates on top which soon solidifies. It is filtered, washed and dried. 95 parts of 3,3-dibenzyl N.tert-butyl lactamide are obtained, that is a yield of 97.9%.

By recrystallization from ethyl acetate beautiful needles are obtained. M.p. 166°C.

| Analysis for | $C_{21}H_{27}NO_2$ | M.W. = 325 | |
|---|---|---|---|
| Calculated: | C% 77.54 | H% 8.31 | N% 4.31 |
| Found: | 77.32 | 8.20 | 4.32 |

B. 47 parts of the above lactamide are dissolved in 188 parts by volume of acetic acid. Furthermore, 11.7 parts of chromium trioxide are dissolved in 48 parts of 90% acetic acid. The two solutions are mixed, the mixture is heated to 90°–95°C. for 4 hours and 250 parts of water are added.

To remove the traces of chromium salt, the mixture is extracted with ether (150 + 50), the ether layers are washed with a solution of 5 N sodium hydroxide (2×25) until alkaline and then with water. The ether solutions are dried and the ether is removed. 45.8 parts of an oil are obtained which crystallizes. The crystals are dissolved at elevated temperature in 100 parts by volume of hexane, allowed to crystallize, filtered and dried. 41 parts of 3,3-dibenzyl N.tert-butyl pyruvamide are obtained, that is a yield of 90% in recrystallized product.

M.p. = 65°C.

| Analysis for | $C_{21}H_{25}NO_2$ | M.W. = 323 | |
|---|---|---|---|
| Calculated: | C% 77.98 | H% 7.79 | N% 4.33 |
| Found: | 77.96 | 7.71 | 4.44 |

Characteristic derivative: 2',4'-dinitro-2-phenylhydrazono-3,3-dibenzyl N.tert-butyl-propanamide $C_{27}H_{29}N_5O_5$ M.p. 169°C.

C. 19.3 parts of 3,3-dibenzyl N.tert-butyl pyruvamide are dissolved in 145 parts by volume of acetic acid and 145 parts of hydrochloric acid (d=1.19). The solution is heated under reflux during 24 hours, 500 parts of water are added and the crystallization is initiated. The crystallized product is filtered and washed with water.

Under such conditions, the α-keto acid retains very large quantities of water. It is dissolved at elevated temperature in 65 parts by volume of benzene, the solution is filtered and the benzene is eliminated. 15.6 parts (theory 15.8) of an oil remain which commences to crystallize. It is dissolved in 65 parts of cyclohexane at elevated temperature, allowed to crystallize, the crystals are filtered, washed and dried until of constant weight. 13.8 parts of 3,3-dibenzyl pyruvic acid are obtained, that is a yield of 87.3% of recrystallized product. M.p. = 77°C. This acid crystallizes in large prisms, forming twin crystals.

| Analysis for | $C_{17}H_{16}O_3$ | M.W. = 268 | M.p. 77°C. |
|---|---|---|---|
| Calculated: | C% 76.11 | H% 5.97 | |
| Found: | 75.99 | 6.02 | |

Characteristic derivative: 2',4'-dinitro-2-phenylhydrazono-3,3-dibenzyl propionic acid. M.p. 189°C.

The following Table I gives the characteristics of different hydroxy-amides of formula:

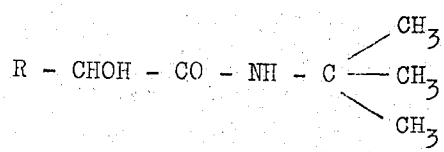

obtained according to processes A of the preceding Examples.

TABLE I

| R | M.W. | M.p. or B.p. | Yields | Crystallization solvent |
|---|---|---|---|---|
| ethyl | 159 | 57°C. 143°/16 mm | 86% | pentane |
| propyl | 173 | 60°C. | 78% | hexane |
| phenyl | 207 | 120°C. | 93% | benzene |
| benzyl | 221 | 71°C. | 97.5% | hexane |
| phenylethyl | 235 | 92°C. | 94% | toluene |
| diphenylmethyl | 297 | 153°C. | 95% | ethylacetate |

The following Table II gives the characteristics of new oxo-amides of formula:

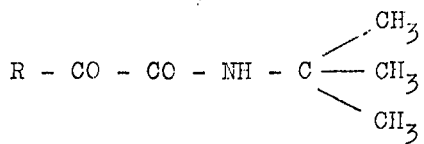

obtained according to processes B of the preceding Examples.

In the column "Analyses" c and f mean "calculated" and "found" respectively. The column R—NH—N= gives the melting point of the 2',4'-dinitro-2-phenylhydrazono derivative of the ketoamide.

TABLE II

| R | M.W. | M.p. or B.p. | Yields | Analyses C% | H% | N% | RNHN= |
|---|---|---|---|---|---|---|---|
| ethyl | 157 | 34°C. 82°/14 mm | 56% | c 61.12 f 61.05 | 9.62 9.59 | 8.91 8.80 | 164°C. |
| propyl | 171 | 90°/10 mm | 61% | c 63.12 f 63.26 | 10.01 10.01 | 8.18 8.26 | 159°C. |
| phenyl | 205 | 77°C. | 82% | c 70.22 f 70.21 | 7.37 7.30 | 6.82 6.90 | 252°C. |
| benzyl | 219 | 53°C. | 78% | c 71.21 f 71.04 | 7.80 7.92 | 6.39 6.33 | 201°C. |
| β-phenyl-ethyl | 233 | 47°C. | 87% | c 72.07 f 72.82 | 8.21 8.16 | 6.00 5.93 | 152°C. |
| diphenyl-methyl | 295 | 103°C. | 60% | c 77.26 f 77.22 | 7.17 7.21 | 4.74 4.78 | 165°C. |
| hexyl | 213 | 98°C/1mm | 70% | | | | 130°C. |
| nonyl | 255 | 96°C/0.5 mm | 81% | | | | 87°C. |

The following Table III gives the characteristics of different acids of formula R—CO—COOH prepared according to processes C of the preceding Examples.

TABLE III

| R | M.W. | M.p. or B.p. | Yields | Analyses C% | H% | RNHN= |
|---|---|---|---|---|---|---|
| ethyl | 102 | 66–67°C. 12 mm | 48% | c 47.06 f 46.72 | 5.92 5.84 | 180°C. |
| propyl | 116 | 78–79°C. 12 mm | 55% | c 51.72 f 51.86 | 6.94 7.09 | 109°C. |
| phenyl | 150 | 62°C. | 82% | c 64.00 f 64.05 | 4.03 3.99 | 193°C. |
| benzyl | 164 | 150°C. | 60% | c 65.85 f 65.65 | 4.91 4.96 | 183°C. |
| β-phenyl-ethyl | 178 | 44°C. | 62% | c 67.40 f 67.32 | 5.66 5.74 | 145°C. |
| diphenyl-methyl | 240 | 113°C. | 88% | c 74.98 f 75.02 | 5.03 5.03 | 210°C. |
| hexyl | 158 | 62°C./0.5 0.32 mm | 72% | | | 131°C. |
| nonyl | 200 | 45°C. | 79% | | | 125°C. |

I claim:
1. A process for the preparation of an α-ketocarboxylic acid of the formula: R—CO—COOH, in which R is selected from the group consisting of aliphatic, benzyl, phenyl and aralkyl radicals, which consists essentially of the successive steps of
   a. condensing in acid medium a secondary or tertiary alcohol of the formula

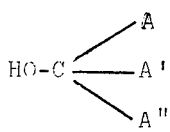

wherein A is selected from the group consisting of hydrogen, aliphatic, and aralkyl radicals, and A' and A'' are selected from the group consisting of aliphatic and aralkyl radicals, with a 2-hydroxy nitrile of the formula R-CHOH-CN in which R has the above meanings to form the corresponding α-hydroxy carboxamide of the formula

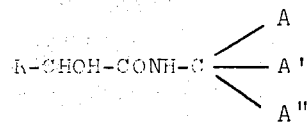

wherein R, A, A' and A'' have the above meanings, b. oxidizing said α-hydroxy carboxamide with an oxidizing agent in solution to form an α-ketocarboxamide of the formula:

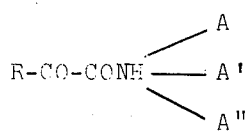

wherein A, A', A'' and R have the same meanings as above and further wherein said oxidizing agent is selected from the group consisting of chromium trioxide, manganese dioxide and permanganates; and
   c. hydrolyzing said α-ketocarboxamide in an acid medium to form said α-ketocarboxylic acid.

2. The process as defined in claim 1 wherein A, A' and A'' are methyl.

3. The process as defined in claim 2 wherein said oxidizing agent is an aqueous solution of chromium trioxide and acetic acid.

4. A process for the preparation of α-ketocarboxylic acids of the formula R—CO—COOH, in which R is selected from the group consisting of aliphatic, benzyl, phenyl and aralkyl radicals, which consists essentially of the successive steps of a. condensing, in sulphuric acid medium, tertbutyl alcohol with a 2-hydroxy nitrile of the formula R-CHOH-CN in which R has the above meaning, to form the corresponding α-hydroxy-N-tert-butyl carboxamide of the formula

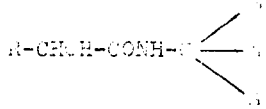

wherein R has the above meaning and A represents a methyl radical, b. oxidizing said α-hydroxy carboxamide with $CrO_3$ in an aqueous acetic acid solution,
c. hydrolyzing the so formed α-keto carboxamide in acid medium, and
d. separating and collecting the α-ketocarboxylic acid which is formed.

5. A process according to claim 4 wherein R is an ethyl radical.
6. A process according to claim 4 wherein R is a propyl radical.
7. A process according to claim 4 wherein R is a phenyl radical.
8. A process according to claim 4 wherein R is a benzyl radical.
9. A process according to claim 4 wherein R is a beta-phenyl ethyl radical.
10. A process according to claim 4 wherein R is a diphenyl methyl radical.
11. A process according to claim 4 wherein R is an hexyl radical.
12. A process according to claim 4 wherein R is a nonyl radical.
13. A process according to claim 4 wherein R is a dibenzyl methyl radical.

* * * * *

UNITED STATES PATENT AND TRADEMARK OFFICE
CERTIFICATE OF CORRECTION

PATENT NO. : 3,897,467
DATED : July 29, 1975
INVENTOR(S) : Jesus Anatol

It is certified that error appears in the above-identified patent and that said Letters Patent are hereby corrected as shown below:

The name of the assignee must read:

SUCRERIES DU SOISSONNAIS ET COMPAGNIE SUCRIERE

Signed and Sealed this

Thirteenth Day of July 1976

[SEAL]

Attest:

RUTH C. MASON
*Attesting Officer*

C. MARSHALL DANN
*Commissioner of Patents and Trademarks*